No. 11,680.

Reissued July 19, 1898.

F. F. LANDIS.

CENTRIFUGAL GRAIN SEPARATOR.

(Application filed Nov. 29, 1897.)

3 Sheets—Sheet 1.

Witnesses
F. L. Ourand
S. M. Harding.

Inventor
Frank F. Landis,
per E. W. Bradford
Attorney

THE NORRIS PETERS CO., PHOTO-LITHO., WASHINGTON, D. C.

No. 11,680. Reissued July 19, 1898.

F. F. LANDIS.

CENTRIFUGAL GRAIN SEPARATOR.

(Application filed Nov. 29, 1897.)

3 Sheets—Sheet 2.

Witnesses
F. L. Ourand
S. M. Harding

Inventor
Frank F. Landis,
per E. W. Bedford
Attorney

THE NORRIS PETERS CO., PHOTO-LITHO., WASHINGTON, D. C.

No. 11,680. Reissued July 19, 1898.

F. F. LANDIS.

CENTRIFUGAL GRAIN SEPARATOR.

(Application filed Nov. 29, 1897.)

3 Sheets—Sheet 3.

Witnesses
F. L. Ouvand.
S. M. Harding.

Inventor
Frank F. Landis,
per E. W. Bradford
Attorney

THE NORRIS PETERS CO., PHOTO-LITHO., WASHINGTON, D. C.

UNITED STATES PATENT OFFICE.

FRANK F. LANDIS, OF WAYNESBOROUGH, PENNSYLVANIA.

CENTRIFUGAL GRAIN-SEPARATOR.

SPECIFICATION forming part of Reissued Letters Patent No. 11,680, dated July 19, 1898.

Original No. 551,492, dated December 17, 1895. Application for reissue filed November 29, 1897. Serial No. 660,176.

*To all whom it may concern:*

Be it known that I, FRANK F. LANDIS, a citizen of the United States, and a resident of Waynesborough, in the county of Franklin and State of Pennsylvania, have invented certain new and useful Improvements in Centrifugal Grain-Separators; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

This invention relates to centrifugal grain-separators; and it consists in the novel construction and combination of parts hereinafter fully described and claimed.

Figure 1:
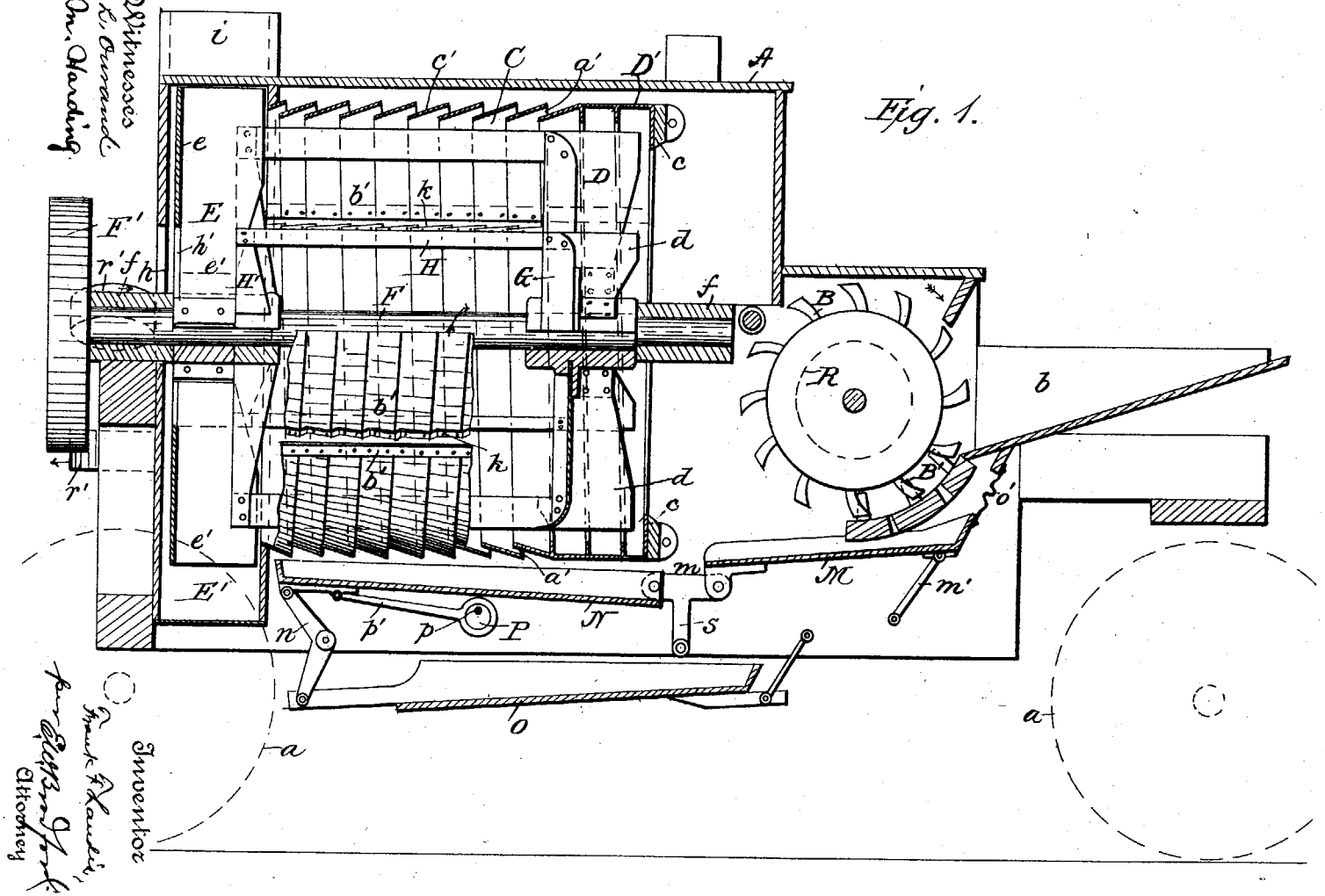
Figure 2:
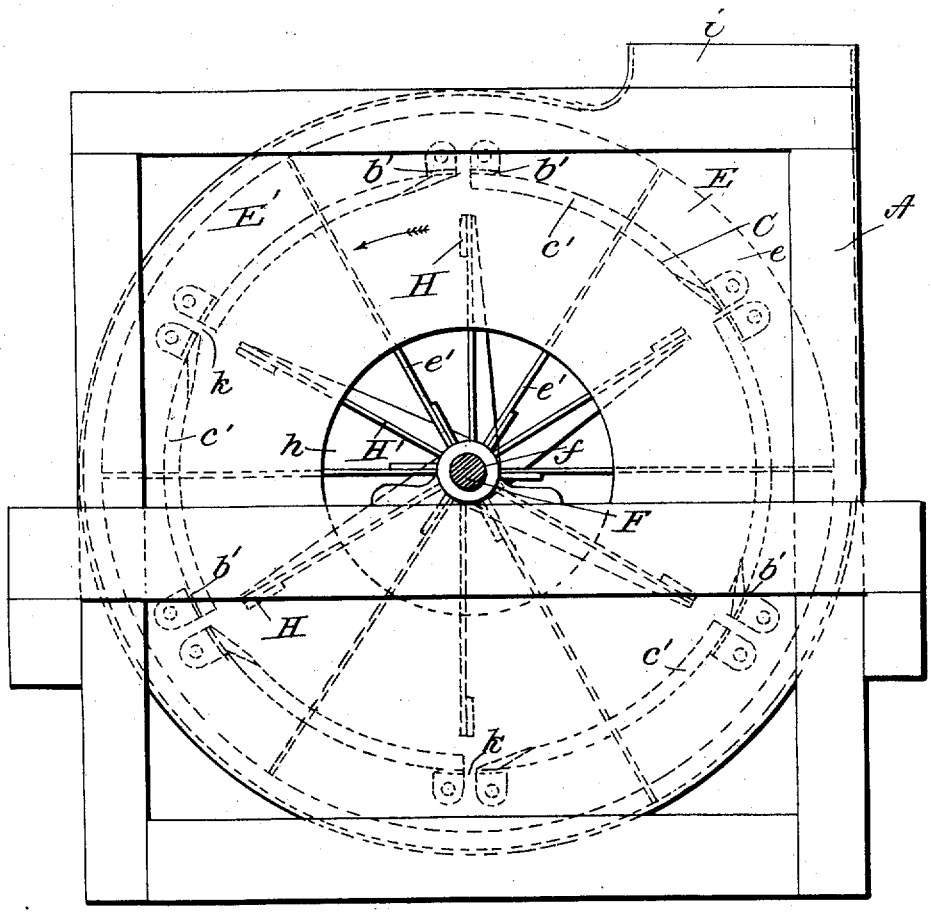
Figure 3:
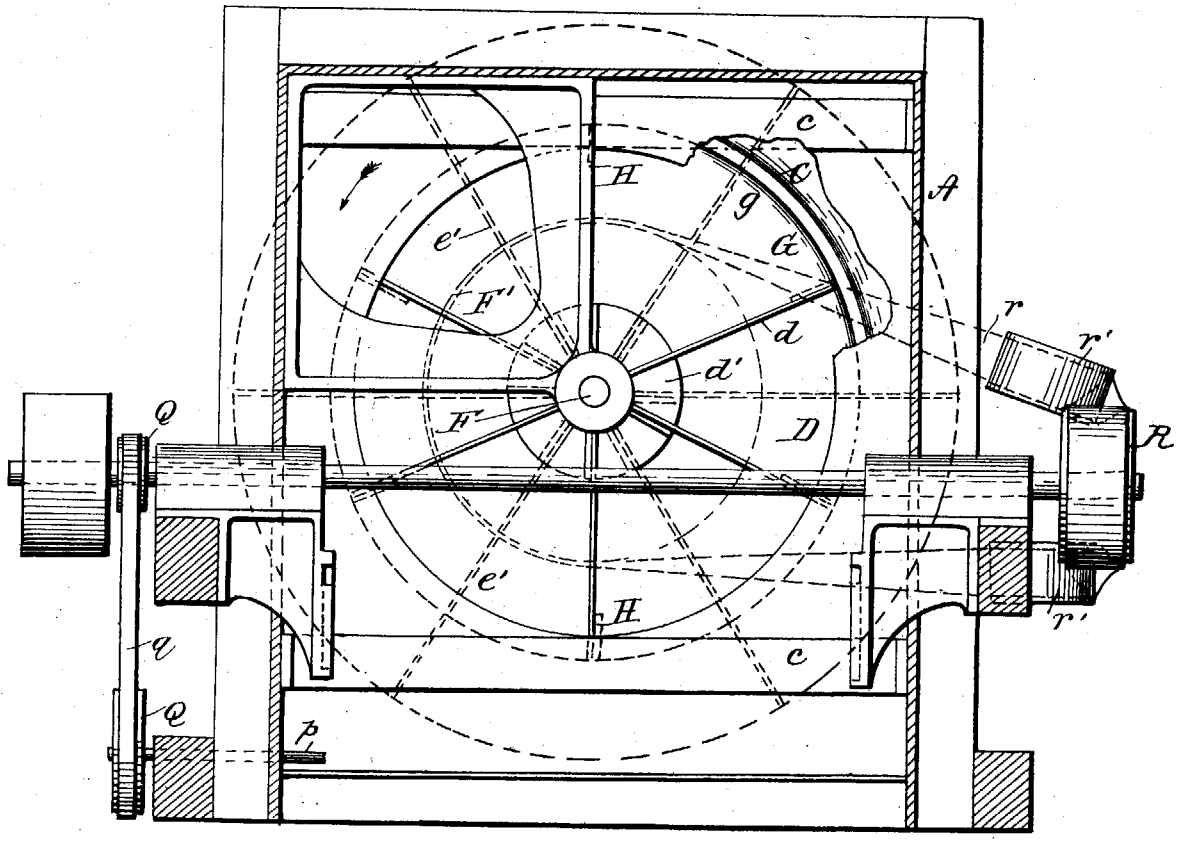

In the drawings, Figure 1 is a longitudinal section through a grain-separator constructed according to this invention. Fig. 2 is a rear end view. Fig. 3 is a front end view, partly in section.

A is the inclosing case of the machine, which is preferably mounted on wheels *a* of any approved construction. B is the threshing-cylinder, B′ is the concave, and *b* is the hopper for receiving the unthreshed grain. All these parts are of any approved construction, and the grain is threshed out as it passes between the cylinder and concave.

C is a horizontally-arranged cylindrical chamber supported in the casing A behind the cylinder and concave. The front end of the chamber C is supported by cross-bars *c*, which are secured to the casing A, and its rear end is secured to the casing E′ of the straw-discharger, which will be more fully described hereinafter.

The chamber C is formed of a series of conical rings or convolutions *c*′, which are preferably formed in sections arranged in the form of spirals, narrow longitudinal passages *k* being left between the sections; but, if desired, the said chamber may be formed of a single continuous plate bent to the form of spiral rings or convolutions. The conical rings *c*′ incline inwardly toward the rear of the machine and preferably overlap each other to a slight extent, leaving narrow circumferential passages *a*′ between them. The rings or convolutions *c*′ are supported in position by longitudinal bars *b*′, secured to the discharger-casing and to the front end portion D′ of the chamber C. The edges of the plates at one end of the sections are preferably bent cylindrical, so that one half of the bars *b*′ are straight and the other half bent to fit against the conical portions of the sections, leaving the longitudinal passages *k* between the adjacent ends of the sections. The front end portion D′ of the cylinder C is cylindrical and is secured to the cross-bars *c*, forming a chamber for the fan D. The fan D is provided with radial arms *d* and a hub *d*′.

F is a central shaft on which the fan D is secured. This shaft is journaled in bearings *f*, which are supported by the framing of the machine in any approved manner. F′ is a pulley secured to the shaft F at the rear end of the machine for the purpose of revolving the shaft F and the parts carried by it.

G is a spreading-disk secured on the shaft F, close behind the fan D, and provided with a rearwardly-curved edge *g*.

E is the discharger, consisting of an end disk *e* and radial arms *e*′, secured on the shaft F inside the casing E′.

H are longitudinal bars connecting the arms of the said fan with the arms H′, secured on the shaft F between the arms *e*′ of the discharger. These bars H revolve in close proximity to the periphery of the chamber C.

The discharger-casing is provided with an air-inlet opening *h* near the shaft F, and the discharger-disk has a corresponding opening *h*′. The discharger-casing is also provided with a delivery-passage *i* in its periphery leading into the discharge-pipe of the stacker, which is not shown in the drawings. The opening *h* in the discharger-casing can be regulated by any approved form of door or shutter.

M and N are two reciprocatory gather-boards. The adjacent ends of these two gather-boards are pivoted to the upper part of a T-shaped link *s*, leaving an open space *m* between the ends of the gather-boards. The gather-board M is arranged in an inclined position under the cylinder and concave, and its front end is pivoted to the casing by two similar links *m*′. The gather-board N is arranged under the chamber C in an inclined position, and its rear end is supported by two similar arms *n*, pivoted to the casing. The two gather-boards are inclined toward each other.

A conveyer-board O is pivoted in an inclined position under the open space *m*. The front end of the board O is carried by two similar links *o*, which are pivoted to the casing. The rear end of the board O is carried by prolongations of the arms *n* below their pivots.

P is an eccentric secured on a shaft *p*, which is journaled in the casing under the gather-board N, and P′ is an eccentric-rod operatively connecting the said eccentric with the gather-board N. The shaft *p* is revolved by means of belt-pulley Q on the cylinder-shaft. A belt *q* passes over the pulley Q and over a pulley Q′, secured on the shaft *p*.

The space between the front end of the gather-board M and the under side of the grain-hopper is filled in with a piece of flexible material *o*′, such as canvas. The discharger and fan are driven by a pulley R on the cylinder-shaft and a belt *r*, which passes around the pulley R, over the guide-pulleys *r*′, and around the pulley F′ on the shaft F.

The operation of the separator is as follows: Most of the grains fly out from the heads at the concave and pass through the open space *m* between the two gather-boards. A strong current of air is drawn by the fan D through the open space *m*, and all the straw and chaff are drawn into the chamber C by the said fan. The straw is whirled around in the front part of the chamber C by the fan and passes off in a loose uniform stream around the periphery of the spreading-disk G. The straw is whirled around in the chamber C by the longitudinal bars H, is kept in a loose condition, and is brought in contact with the spiral and conical convolutions *c*′. The spiral form of these rings or convolutions causes the straw to move to the rear, and the grains, which are driven out of the straw by centrifugal force, are deflected by the conical sides of the convolutions and pass through the passages between the convolutions and between their sections. The discharger also assists in drawing the straw through the chamber C and draws in air through the passages between the convolutions, so that no chaff is discharged through said passages. The discharger receives all the straw and chaff from the chamber C and forces it up the delivery-passage to the straw-stacker discharge-pipe. It will thus be seen that the straw and chaff, with the grain it contains, is spread out into a thin annular sheet in the chamber B′, where it is given a rotary or whirling motion by the fan D and a forward motion by the internal spiral rib in said chamber, and by these forces and means is fed into the chamber C, in such a thin loose condition, between the outer edges of the bars H and the inner edges of the spirally-arranged rings, the spreading-disk G being of that diameter that its outer edge and the outer edges of said bars H are in line. The straw is thus held in this space and carried forward by the spirals, which serve as a conveyer. It is not thrown outwardly, beaten, or forced against the rings, except to be held against them and kept whirling around and around until it reaches the discharger. The centrifugal force operates to throw the grain, being small and of greater weight, through the openings; but the straw is carried through the chamber in this narrow annular path, and is thus not broken up and its short portions are not thrown through the openings with the grain.

I do not confine myself to the devices shown for imparting motion to the various parts of the machine, nor to the detailed construction of the component parts, nor to the arrangement of the gather-boards, as these features may be modified in many ways in carrying out the invention.

What I claim is—

1. The combination, with a threshing-cylinder and its concave, of a suction-fan arranged behind the said parts, the axis of the said fan being substantially horizontal and opposite the upper side of the middle portion of the cylinder, and a gather-board arranged under the said cylinder and concave, leaving an open air-inlet space between its rear edge and the fan, whereby the grains are permitted to pass down the said space and the straw and chaff are drawn into the lower half of the eye of the said fan substantially as set forth.

2. The combination, with a threshing-cylinder and its concave and a suction-fan and a grain-separating chamber arranged behind the said parts, the axis of the said fan and chamber being substantially horizontal and opposite the upper side of the middle portion of the said cylinder, whereby the straw and chaff are drawn into the lower half of the eye of the fan; of the two gather-boards inclined toward each other and having an open air-inlet space between them under the entrance to the suction-fan, and means for supporting and oscillating the said gather-boards, substantially as set forth.

3. The combination, with a cylindrical grain-separating chamber having rearwardly and inwardly inclined passages at its periphery for the escape of grain and the inlet of air, of a suction-fan arranged at one end of the said chamber, means for whirling around the straw in the said chamber, and a discharger at its opposite end, substantially as set forth.

4. The combination with a cylindrical grain-separating chamber formed of spirally-arranged overlapping plates and having rearwardly and inwardly inclined passages in its periphery, of a suction-fan arranged at one end of the said chamber, and a spreading-disk secured to the said fan inside the chamber, whereby the straw is drawn in and whirled around in contact with the periphery of the chamber, substantially as set forth.

5. The combination, with a cylindrical grain-separating chamber having passages in its periphery, of a suction-fan at one end of the chamber, a discharger at its opposite end, a spreading-disk inside the chamber, and bars arranged longitudinally in the chamber between the said fan and discharger, substantially as set forth.

6. The combination, with a cylindrical grain-separating chamber having passages in its periphery, of a discharger provided with arms and arranged at the rear end of the said chamber, radial supporting-arms secured to the discharger and arranged intermediate of its arms, a suction-fan provided with arms and arranged at the front end of the said chamber, and longitudinal bars secured to the arms of the suction-fan and to the said supporting-arms, substantially as set forth.

7. The combination, with a cylindrical grain-separating chamber provided with rearwardly and inwardly inclined passages at its periphery for the escape of grains and the inlet of air, and a discharger-casing arranged at the rear of the said chamber and provided with an air-inlet opening at its rear side; of a shaft passing through the said chamber and casing, means for whirling around the straw, secured on the said shaft inside the said chamber, and a discharger provided with arms and having a disk at its rear side provided with an air-inlet opening around its center, substantially as set forth.

8. The combination, with a cylindrical grain-separating chamber formed of conical overlapping rings having passages between them, of a central shaft, a suction-fan secured to the front end of said shaft, a discharger secured on its rear end, and bars supported intermediate of the said fan and discharger, for whirling around the straw in the said chamber, substantially as set forth.

9. The combination, with a cylindrical grain-separating chamber formed of conical spirally-arranged convolutions overlapping each other and having rearwardly and inwardly inclined passages between them, of means for whirling around the straw in the said chamber, substantially as set forth.

10. The combination, with a cylindrical grain-separating chamber formed of sections arranged in the form of conical and spiral convolutions having passages between the convolutions and between the adjacent ends of the sections, of supports for holding the said sections in position, and means for whirling around the straw in the said chamber, substantially as set forth.

11. The combination with threshing mechanism, of separating mechanism consisting of an outer case, a chamber within said case, a discharger beyond the discharge end of said chamber, a rotary reel or arms within said chamber, apertures in the sides of said chamber, and discharge-openings from said case for the grain, substantially as set forth.

12. A separator for threshing-machines consisting of a case, a chamber therein, a discharger beyond the discharge end of said case, a rotary reel or arms in said chamber, a spreading-disk covering the greater portion of the entrance to said chamber, and openings for the discharge of the grain, substantially as set forth.

13. A separator for threshing-machines consisting of an outer casing, a chamber therein, a discharger at the discharge end of said chamber, a shaft with a reel or arms within said chamber, a spreading-disk on said shaft at the entrance to said chamber, other arms carried by said shaft on the opposite side of said disk, and discharge-apertures for the grain, substantially as set forth.

14. The combination, in a threshing-machine, of the threshing mechanism and a separating mechanism, consisting of a chamber provided with an annular entrance near its periphery of comparatively narrow width, a discharger at the other end, a rotary reel or arms within said chamber, openings in the sides of said chamber, and discharge-openings for the grain, substantially as set forth.

15. The combination, of the threshing mechanism, the separating-chamber, a spreading-disk directly facing the material as it comes from the threshing mechanism, said disk covering the entrance to said separating-chamber to a point near its periphery and leaving a narrow annular interval, separating and conveying devices adapted to carry the material forward in the space next the periphery of the chamber, and the discharging mechanism, substantially as set forth.

16. The combination, in a threshing-machine, with the threshing mechanism, of a separator consisting of a perforated cylinder, a whirling and conveying reel within, the ribs whereof are parallel with and a short distance from the inner surface of said cylinder, a spreading-disk of substantially the same diameter as said reel covering the entrance thereto to the size of said reel, whereby a narrow annular entrance and passage for the straw are provided through the chamber next to its outside, substantially as set forth.

17. The combination, of the threshing mechanism, the separating-chamber composed of spirally-arranged rings with spaces between them, a spreading-disk directly facing the threshing mechanism and the material as it comes therefrom, said disk covering the entrance to said separating-chamber to a point near its periphery and leaving a narrow annular interval, a reel within said chamber, means for feeding the material between the arms of said reel and the periphery of said chamber, and the discharger, substantially as set forth.

In testimony whereof I affix my signature in presence of two witnesses.

FRANK F. LANDIS.

Witnesses:
E. W. BRADFORD,
S. M. HARDING.